United States Patent
Yagi et al.

(10) Patent No.: US 11,780,327 B2
(45) Date of Patent: Oct. 10, 2023

(54) CANISTER MOUNTING STRUCTURE

(71) Applicant: AISAN KOGYO KABUSHIKI KAISHA, Obu (JP)

(72) Inventors: Satoshi Yagi, Obu (JP); Norihiro Kondo, Toyota (JP); Yoshihiro Yasuda, Toyota (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/205,077

(22) Filed: Mar. 18, 2021

(65) Prior Publication Data

US 2021/0300177 A1 Sep. 30, 2021

(30) Foreign Application Priority Data

Mar. 31, 2020 (JP) .................................. 2020-062105

(51) Int. Cl.
  *B60K 15/067* (2006.01)
(52) U.S. Cl.
  CPC .................................. *B60K 15/067* (2013.01)
(58) Field of Classification Search
  CPC ............ B60K 15/067; B60K 15/03504; B60K 15/03514; B60K 15/063; B60K 2015/0634; B60K 2015/0638
  See application file for complete search history.

(56) References Cited

U.S. PATENT DOCUMENTS

| | | | |
|---|---|---|---|
| 4,783,110 A * | 11/1988 | Beukema | ................ B60R 11/00 224/547 |
| 6,308,987 B1 | 10/2001 | Mitake | |
| 6,395,072 B2 | 5/2002 | Miura et al. | |
| 7,614,473 B2 | 11/2009 | Ono et al. | |
| 10,174,722 B2 | 1/2019 | Koga et al. | |
| 10,738,743 B2 | 8/2020 | Kuramoto et al. | |
| 11,285,794 B2 | 3/2022 | Suzuki | |

(Continued)

FOREIGN PATENT DOCUMENTS

| | | |
|---|---|---|
| JP | 2000168377 A | 6/2000 |
| JP | 2001349252 A | 12/2001 |
| JP | 2002048013 A | 2/2002 |

(Continued)

OTHER PUBLICATIONS

Japanese Office Action dated Mar. 28, 2023, for Japanese Application No. 2020-062105 (4 p.).

(Continued)

*Primary Examiner* — Kevin Hurley
*Assistant Examiner* — Michael R Stabley
(74) *Attorney, Agent, or Firm* — CONLEY ROSE, P.C.

(57) ABSTRACT

A vehicle canister mounting structure for a vehicle, the vehicle including a frame and an upper structure, such as a cabin, mounted on the frame, includes a primary bracket and a secondary bracket. The primary bracket is fastened to the frame by a primary fastener. The secondary bracket is fastened to the primary bracket by a secondary fastener and is attached to a canister. One of the primary fastener and the secondary fastener is configured to allow fastening to be performed from above the frame. The other of the primary and secondary fasteners is configured to allow fastening to be performed from below the frame.

4 Claims, 8 Drawing Sheets

(56) References Cited

U.S. PATENT DOCUMENTS

2017/0226966 A1* 8/2017 Koga ................ B01D 46/0036

FOREIGN PATENT DOCUMENTS

| | | | |
|---|---|---|---|
| JP | 2002067716 | A | 3/2002 |
| JP | 2007039020 | A | 2/2007 |
| JP | 2008050977 | A | 3/2008 |
| JP | 2009293438 | A | 12/2009 |
| JP | 4877842 | B2 | 2/2012 |
| JP | 2017141719 | A | 8/2017 |
| JP | 2018135013 | A | 8/2018 |
| JP | 2019090371 | A | 6/2019 |
| JP | 2020040577 | A | 3/2020 |

OTHER PUBLICATIONS

English Translation of Japanese Office Action dated Mar. 28, 2023, for Japanese Application No. 2020-062105 (4 p.).

* cited by examiner

CANISTER MOUNTING STRUCTURE

CROSS-REFERENCE TO RELATED APPLICATIONS

This application claims priority to Japanese patent application serial number 2020-062105, filed Mar. 31, 2020, which is hereby incorporated herein by reference in its entirety for all purposes.

BACKGROUND

The present disclosure relates generally to a structure for mounting a canister to a vehicle body.

A vehicle, such as an automobile, may be provided with a canister that adsorbs fuel vapor generated in a fuel tank. The canister is typically installed on the underside of a rear part of the vehicle underbody. Japanese Patent No. 4877842 discloses a bracket for fixing a canister to the underside of the vehicle body.

SUMMARY

One aspect of the present disclosure is a vehicle canister mounting structure for a vehicle that includes a frame and an upper structure, such as a cabin, mounted on the frame. The vehicle canister mounting structure may include a primary bracket and a secondary bracket. The primary bracket is fastened to the frame by a primary fastener. The secondary bracket is fastened to the primary bracket by a secondary bracket. The secondary bracket is attached to a canister. One of the primary fastener and the secondary fastener is configured to allow fastening to be performed from above the frame. The other of the primary and secondary fasteners is configured to allow fastening to be performed from below the frame.

DETAILED DESCRIPTION

When installing a canister to the underside of a vehicle body in a vehicle factory, a worker typically needs to face upward, toward the underside of the vehicle body, resulting in an undesirable posture. This may place a heavy physical burden on the worker, leading to poor productivity. Thus, there is a need to make it possible to attach the canister to the lower frame not only from below, but also from above. This would allow for attachment of the canister before the vehicle body is mounted to the top of the lower frame.

Figure 1:
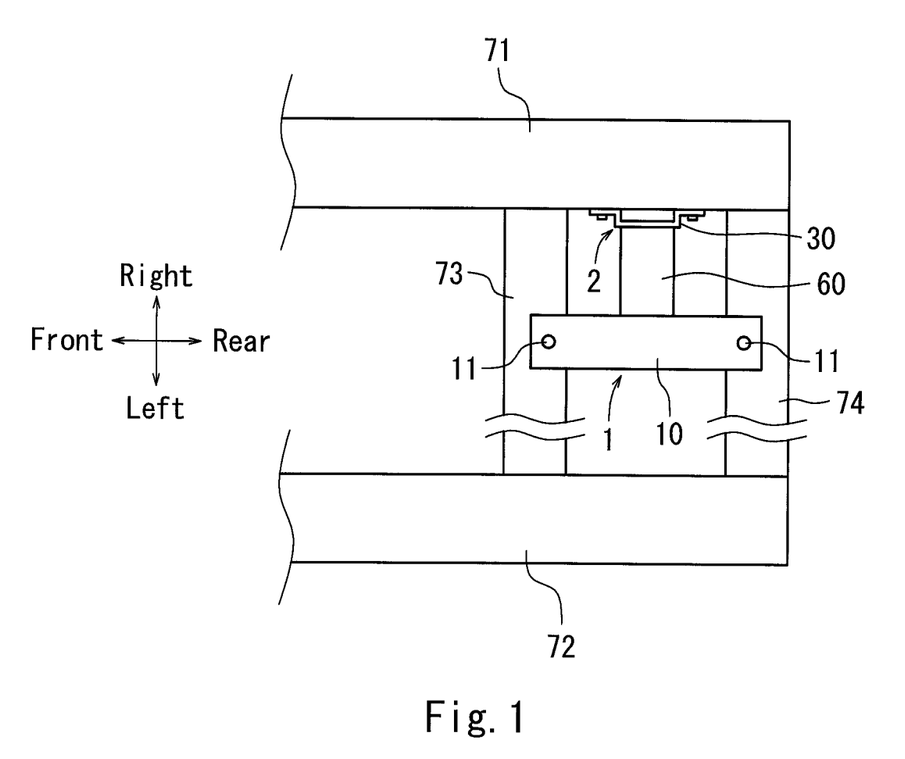
FIG. 1 is a schematic plan view of a canister mounting structure according to an embodiment.
Figure 2:
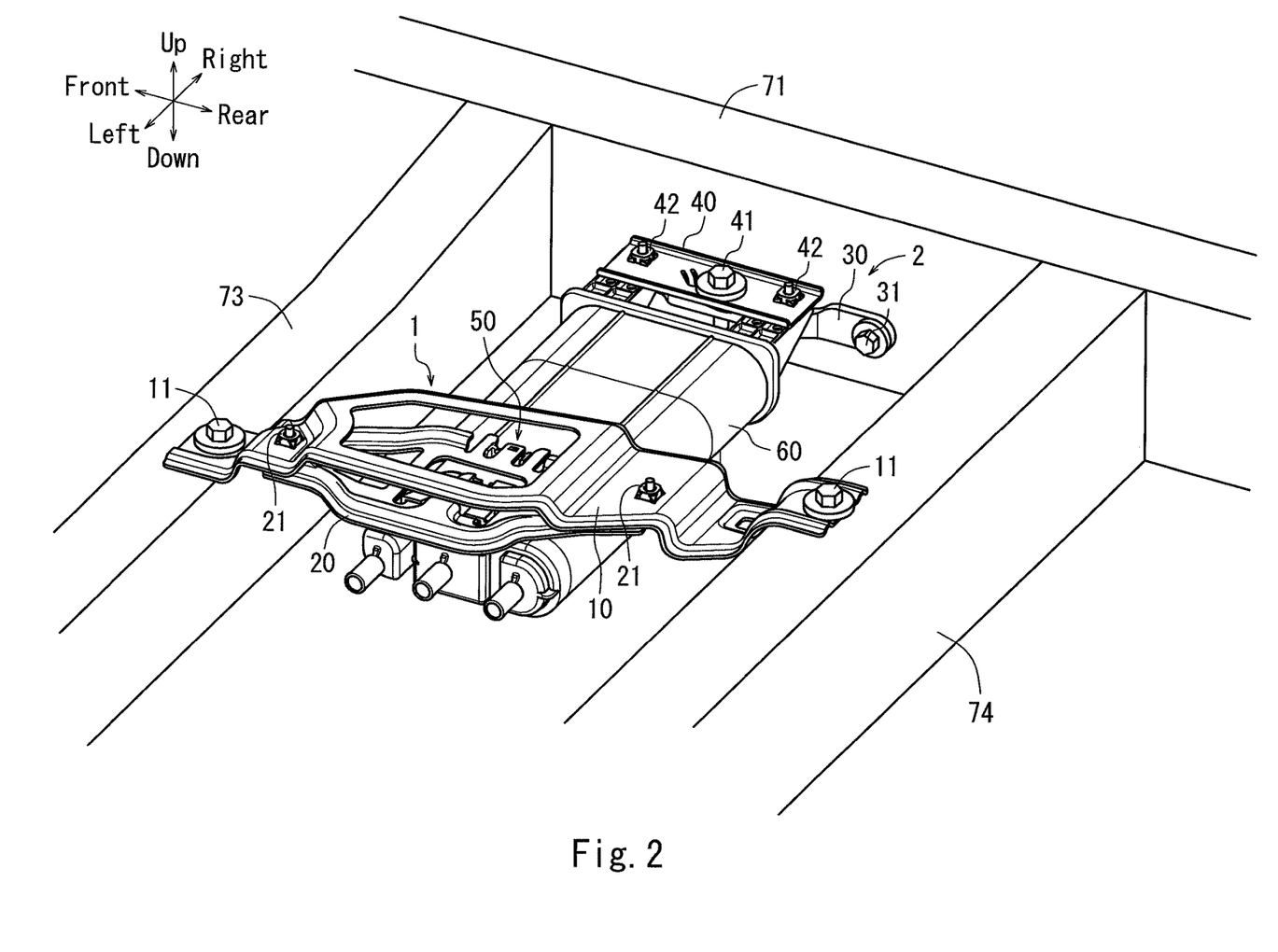
FIG. 2 is an enlarged perspective view of the canister mounting structure of FIG. 1 as seen from above.
Figure 3:
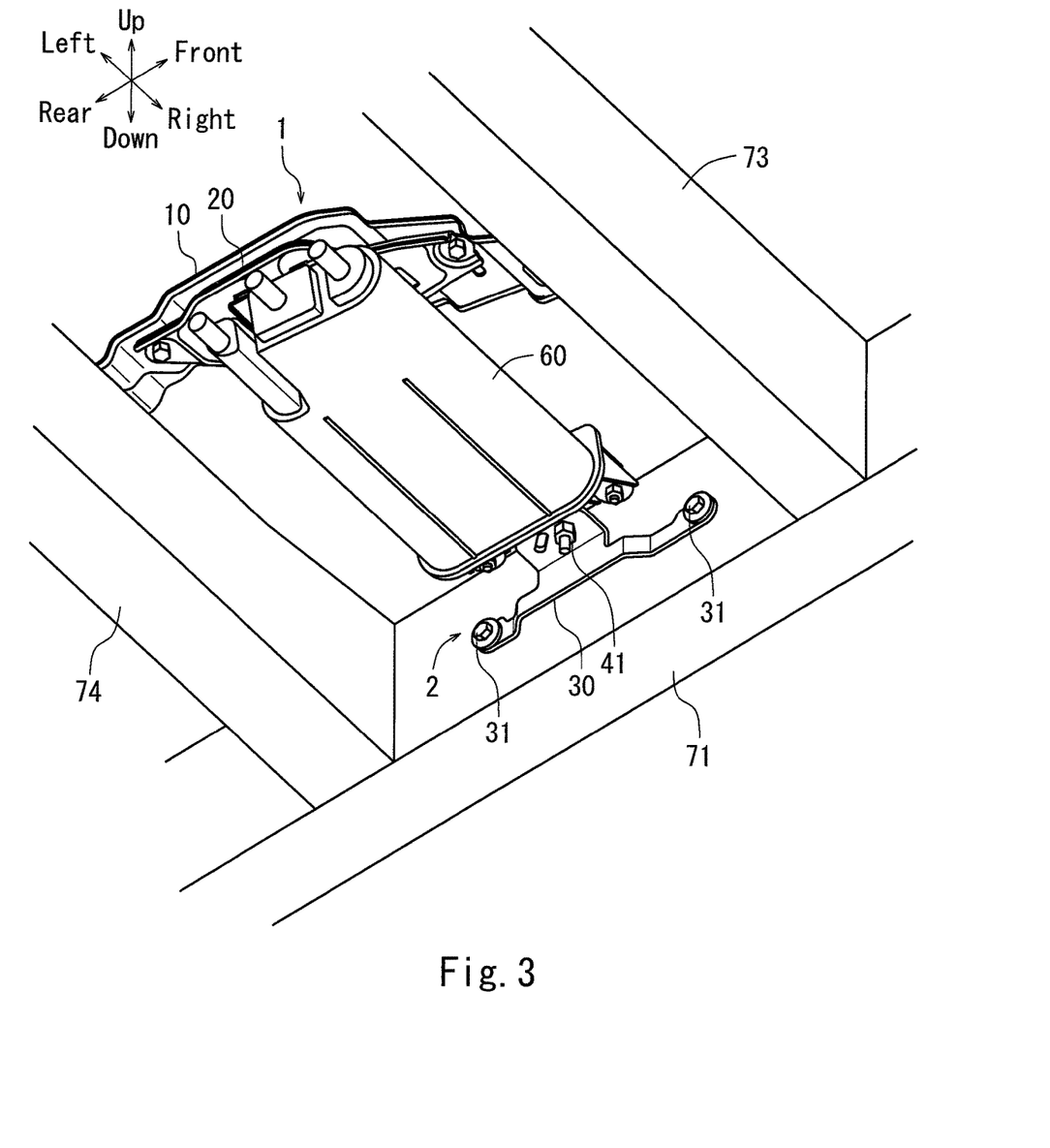
FIG. 3 is an enlarged perspective view of the canister mounting structure of FIG. 1 as seen from below.

FIGS. 1 to 3 show a canister mounting structure according to an embodiment. A vehicle includes a body frame, including a lower frame and an upper structure, such as a cabin, mounted on the lower frame. The lower frame includes side members 71, 72 and cross members 73, 74. The cross members 73, 74 extend between the side members 71, 72. A fuel vapor collecting canister 60 is attached to the side members 71, 72 and the cross members 73, 74. The canister 60 may contain activated carbon to adsorb fuel vapor from a fuel tank. In the drawings, arrows are shown to indicate the vertical, front-rear, and left-right directions with respect to the vehicle to which a canister is to be attached. The directional terms used in the descriptions below are based on the directions of these arrows for convenience. However, it should be understood that the canister can be attached to the vehicle at/in positions and/or orientations other than those shown.

The canister 60 is positioned in the space defined by and surrounded by the side members 71, 72 and the two cross members 73, 74. This space may be located in a rear portion of the vehicle. In one embodiment, the canister 60 has a vertically flat, generally cylindrical body, with its length extending in the left-right direction. The left end of the canister 60 is coupled to both the forward and rearward cross members 73, 74, which extend in the left-right direction. In particular, the left end of the canister 60 is coupled to cross members 73, 74 by a left primary bracket 10 and a left secondary bracket 20, which collectively form a first attachment device 1. The canister 60 is attached to the lower side of the left secondary bracket 20 by, for example, a sliding snap fit mechanism 50. The left secondary bracket 20 is fastened to the lower side of the left primary bracket 10 from below by a pair of left secondary fasteners 21. Each left secondary fastener 21 may comprise a pair of threaded fasteners, such as a bolt and a weld nut. The left primary bracket 10 bridges the gap between the cross members 73, 74. The left primary bracket 10 is fastened to the upper surfaces of the cross members 73, 74 from above using a pair of left primary fasteners 11. Each left primary fastener 11 may comprise a pair of threaded fasteners, such as a bolt and a weld nut.

The right end of the canister 60 is coupled to the left side surface of the right side member 71. In particular, the right end of the canister 60 is coupled to the right side member 71 by a right primary bracket 30 and a right secondary bracket 40, which collectively form a second attachment device 2. The canister 60 is fastened to the lower side of the right secondary bracket 40 from below by a pair of third fasteners 42. Each third fastener 42 may comprise a pair of threaded fasteners, such as a bolt and a weld nut. The right secondary bracket 40 is fastened to an upward surface 33 (e.g., see FIG. 4) of the right primary bracket 30 from above by a right secondary fastener 41. The right secondary fastener 41 may comprise a pair of threaded fasteners, such as a bolt and a weld nut. The right primary bracket 30 is fastened to the left vertical surface of the side member 71 from the left side by a pair of right primary fasteners 31. Each right primary fastener 31 may comprise a pair of threaded fasteners, such as a bolt and a weld nut.

Figure 5:
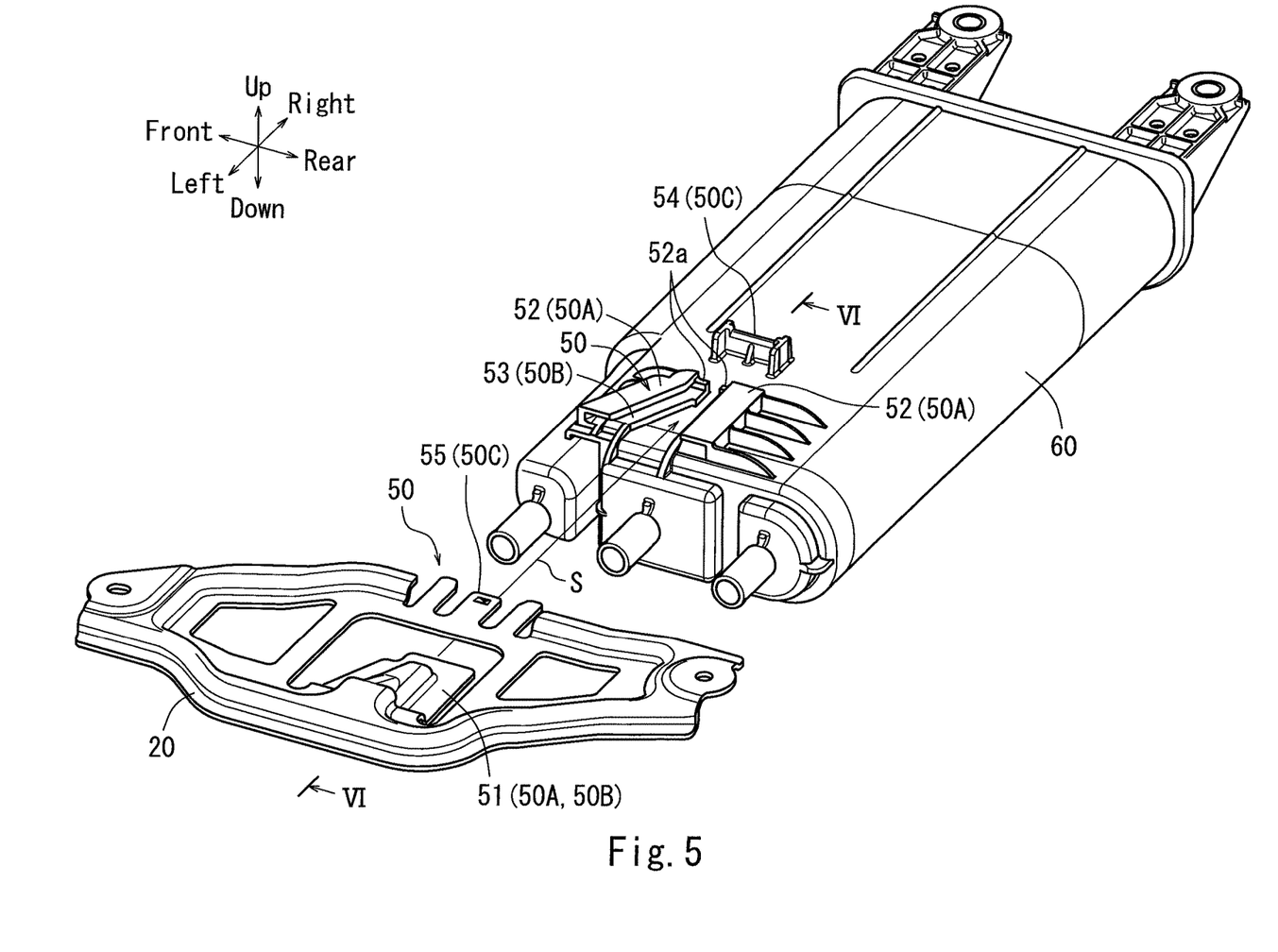
FIG. 5 is a perspective view of the secondary bracket of the canister mounting structure of FIG. 1 detached from the canister.
Figure 6:
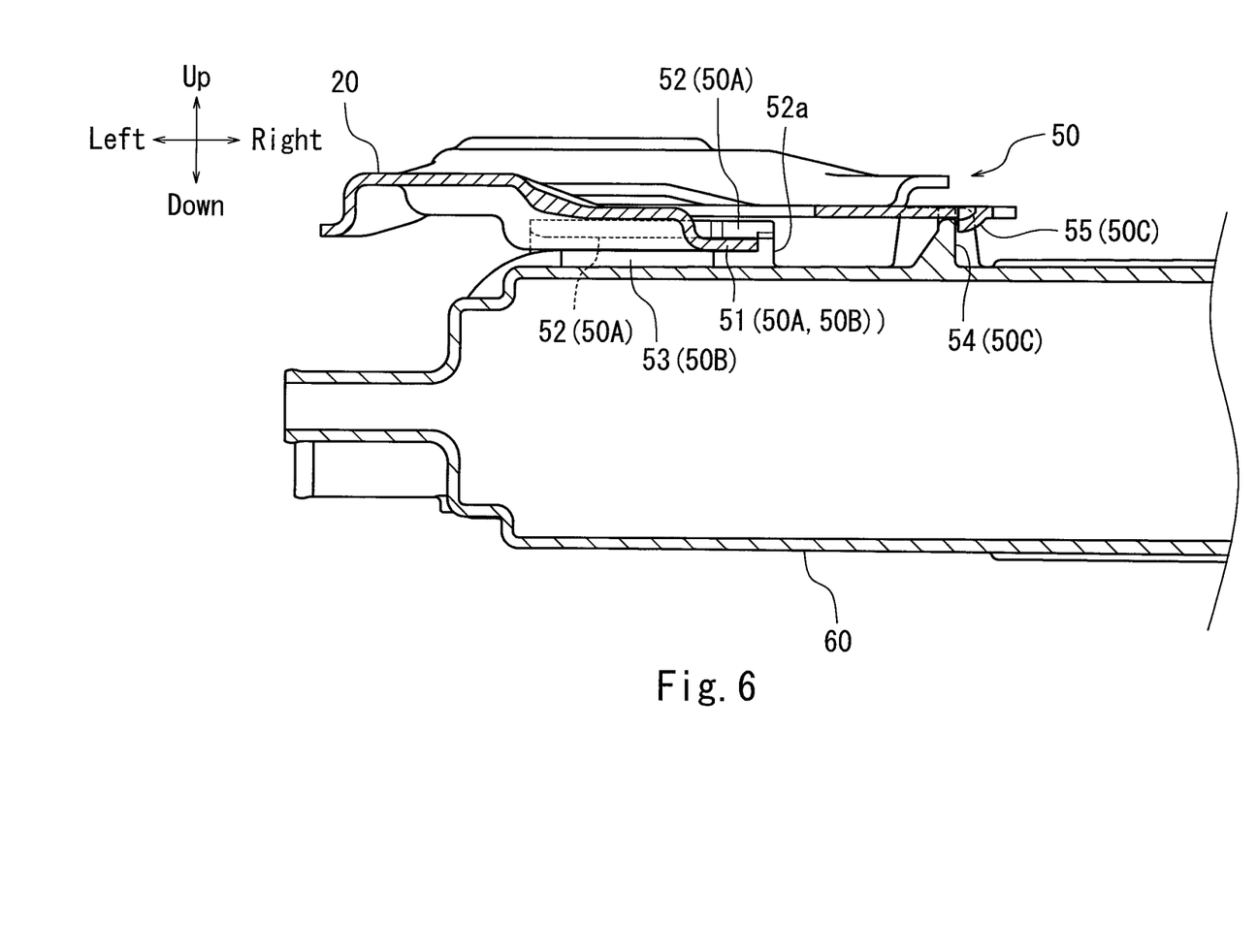
FIG. 6 is a cross-sectional view of the subassembly of the canister and secondary bracket of the canister mounting structure of FIG. 1, taken along line VI-VI of FIG. 5.

As shown in FIGS. 5 and 6, the snap fit mechanism 50 is disposed between the upper left surface of the body of the canister 60 and the left secondary bracket 20. The left secondary bracket 20 includes, on its lower surface, an engaging tab 51 extending to the right. The canister 60 includes an integrally formed engaging sheath 52 that is split in two, with open sides facing each other in the front-rear direction. Together, the engaging tab 51 and engaging sheath 52 form an engagement device 50A. Once the engaging tab 51 is inserted into the vertical gap of the engaging sheath 52, the engaging sheath 52 establishes engagement, such that the left secondary bracket 20 is prevented from being separated from the canister 60 in the upward direction. As a result, the canister 60 and the left secondary bracket 20 are constrained from separating from each other in the vertical direction. In another embodiment, the opposite configuration of the engaging portions is possible, i.e. a similar engaging tab may instead be on the canister 60 and a similar engaging sheath may instead be on the left secondary bracket 20.

The engaging tab 51 and the engaging sheath 52 generally extend linearly in the left-right direction. The engaging tab 51 and the engaging sheath 52 also form a linear slide mechanism 50B. The inner surfaces 53 of the engaging sheath 52 guide the left-to-right sliding attachment of the left secondary bracket 20 into the canister 60, and the removal in the opposite direction, by maintaining contact with the surfaces of the engaging tab 51 until the left secondary bracket 20 is fully inserted into the canister 60.

The left secondary bracket 20 includes, on the right side edge, an integrally formed locking tab 55 extending to the right. The locking tab 55 includes a protrusion on the lower surface. The protrusion may be formed by an embossing process. The canister 60 includes, on the right side of the engagement device 50A, an integrally formed locking edge 54 extending from the upper surface of the canister 60. Together, the locking tab 55 and locking edge 54 form a locking device 50C. As shown in FIG. 6, the locking tab 55 is hooked on the right side of the locking edge 54. This prevents the left secondary bracket 20 from moving back to the left, relative to the canister 60. The locking tab 55 can be unlocked from the locking edge 54 by lifting and elastically bending the locking tab 55 upward. In another embodiment, the opposite configuration of locking portions is possible, i.e. a similar locking tab may instead be on the canister 60, and a similar locking edge may instead be on the left secondary bracket 20.

The snap fit mechanism 50, as described above, allows attachment of the left secondary bracket 20 to the canister 60. This attachment may be performed by sliding the secondary bracket 20 against the canister 60 as shown by an arrow S in FIG. 5. The relative movement of the left secondary bracket 20 and the canister 60 may be constrained by the engaging sheath 52, as shown in FIG. 6, until the left secondary bracket 20 hooks on the locking edge 54. During the insertion, the engaging tab 51 of the left secondary bracket 20 is guided by the inner surfaces 53 of the engaging sheath 52. When the locking tab 55, while being constrained by the engaging sheath 52, passes over the locking edge 54, the locking tab 55 snaps on the locking edge 54. The engaging sheath 52 is closed at its right end by a stopper wall 52a, which prevents the inserted engaging tab 51 from being inserted too far. In general, the parts are positioned and dimensioned such that the locking tab 55 hooks on the locking edge 54 at the moment the right end of the engaging tab 51 reaches the wall 52a. This locks the left secondary bracket 20 and prevents it from moving in either the left or right direction with respect to the canister 60. In this position, the left secondary bracket 20 and the canister 60 are also engaged with each other with respect to the vertical direction, due to the engaging tab 51 being constrained by the engaging sheath 52.

Figure 4:
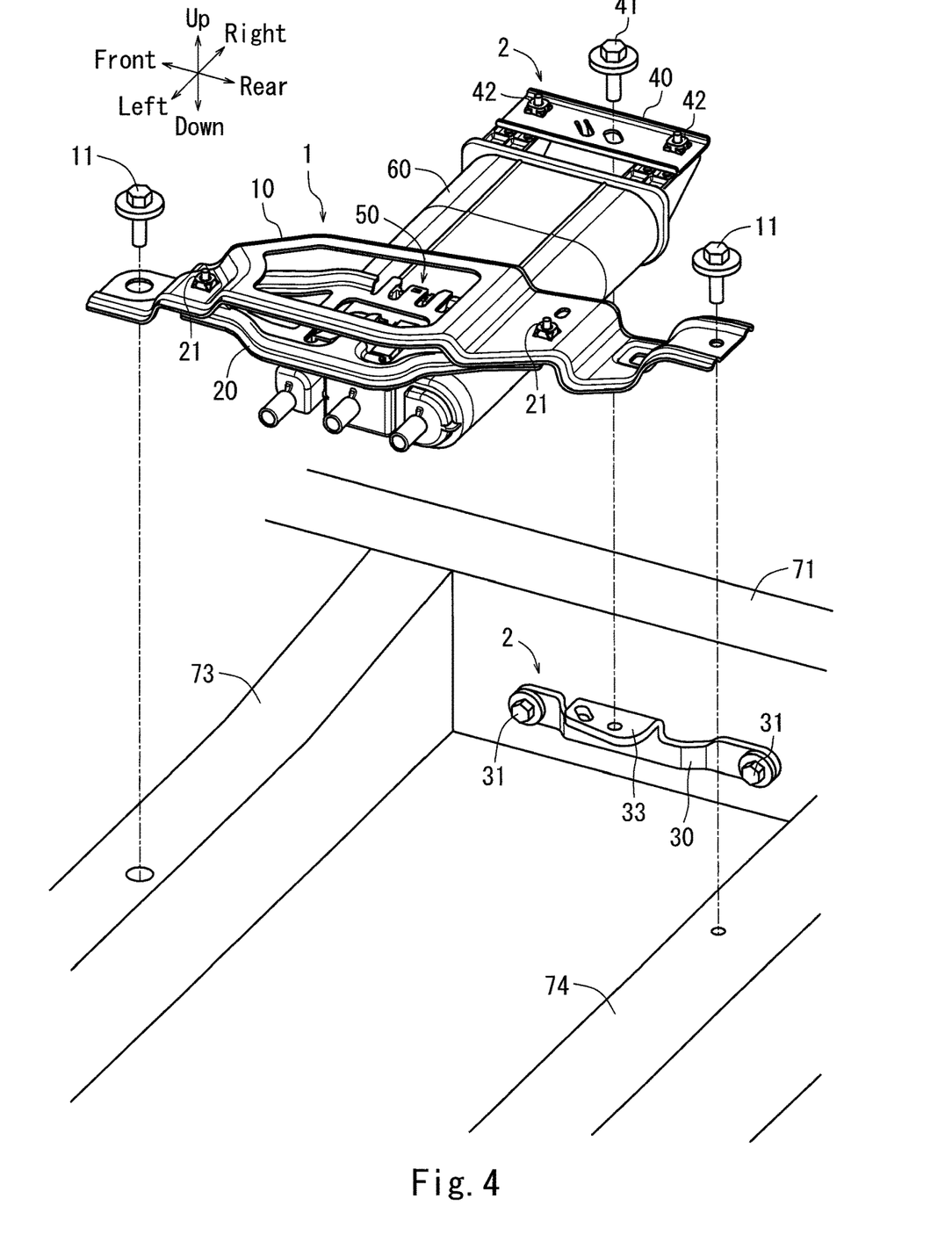
FIG. 4 is a perspective view of the partially disassembled canister mounting structure of FIG. 1.

Referring to FIG. 4, the canister can be fastened to the cross members 73, 74 and the side member 71 according to the following method. In step 1, the left secondary bracket 20 is attached to the canister 60 by the snap fit mechanism 50. In addition, the left secondary bracket 20 is fastened to the left primary bracket 10 using the left secondary fastener 21, and the right secondary bracket 40 is fastened to the upper right surface of the canister 60 using the third fastener 42. Step 1 may be performed separate from the assembly line in the vehicle manufacturing factory.

In step 2, the canister 60, which already had the brackets 10, 20, 40 attached thereto according to step 1, is installed while the vehicle is in the assembly line. First, the right primary bracket 30 is secured to the vertical surface of the side member 71 using the right primary fastener 31. Then, the left primary bracket 10 attached the canister 60 is placed so as to bridge the gap between the upper surfaces of the cross members 73, 74. The left primary bracket 10 is then fastened to the cross members 73, 74 using the left primary fastener 11. This work may be performed from above the cross members 73, 74. Subsequently, the right secondary bracket 40 attached the canister 60 is fastened to the flange 33 of the right primary bracket 30, which has already been fixed to the side member 71, using the right secondary fastener 41. This work may be performed from above the side member 71 and the right primary bracket 30, which may also correspond to above the cross members 73, 74.

In the method described above, only Step 2 is to be performed in the vehicle assembly line of the vehicle manufacturing factory. This is because Step 1 can be performed outside of the line. Moreover, all of the work of Step 2 can be done from above the frame. This is much easier than performing the work from below, thereby leading to improved labor productivity when manufacturing the vehicle. The attachment of the right primary bracket 30 during Step 2 does not have to be performed after the completion of Step 1. Instead, it can be performed at the same time or earlier than Step 1.

The canister 60 may be removed from and reattached to the side member 71 and the cross members 73, 74 for maintenance after sale of the vehicle. In this case, however, the canister 60 has to be accessed from below, since access from above is prevented by the cabin or other upper body structure mounted on top of the side member 71 and the cross members 73, 74. The attachment/detachment of the left end of the canister 60 is performed by attaching/detaching the left secondary bracket 20 to/from the left primary bracket 10. This process can be performed by manipulating the left secondary fastener 21 from below the cross members 73, 74. Further, the attachment/detachment of the right end of the canister 60 is performed by attaching/detaching the right primary bracket 30 to/from the side member 71. This process can be performed by manipulating the right primary fastener 31 from below the side member 71. Since there is an open space below the right primary bracket 30 and the right primary fastener 31, the right primary fastener 31 can be manipulated without much trouble.

As described above, the canister 60 is attached to the left secondary bracket 20 by the snap fit mechanism 50. The left secondary bracket 20 is in turn fastened to the left primary bracket 10 by the left secondary fastener 21. This configuration eliminates engagement and disengagement of the snap fit mechanism 50 when the canister 60 is attached to or detached from the frame. It is therefore not necessary to provide an extra space around the canister 60 for the work of engaging and disengaging the snap fit mechanism 50, e.g. to allow for the linear movement of the left secondary bracket 20 and/or the canister 60 while attached to the lower frame of the vehicle. As a result, the canister 60 can be installed in a location that is limited in space.

Figure 7:
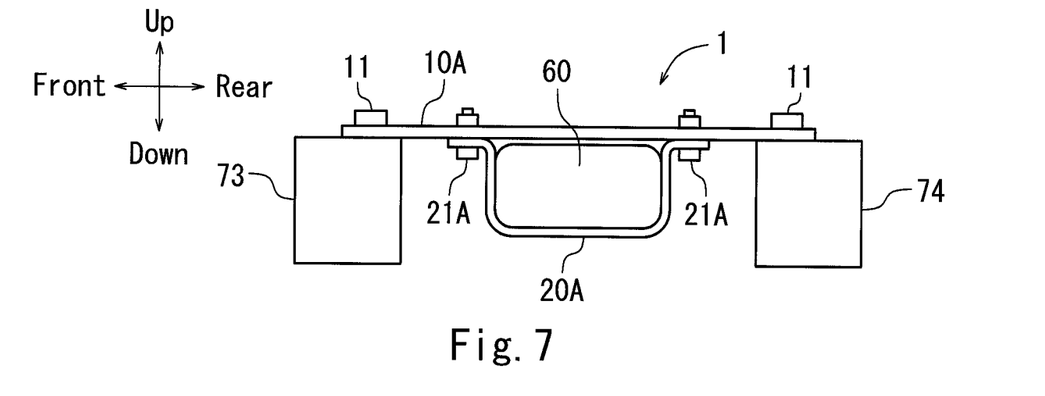
FIG. 7 is a front view of a canister mounting structure according to another embodiment.

Referring now to FIG. 7, which depicts another embodiment, the canister 60 may be is supported by the left secondary bracket 20A from below instead of being suspended from the left secondary bracket 20.

Specifically, the left secondary bracket 20A is configured to wrap the canister 60 from below. The left secondary bracket 20A is fastened, at its forward and rearward ends, to the lower side of the left primary bracket 10A by left secondary fasteners 21A. Each left secondary fastener 21A may comprise a pair of threaded fasteners, such as a bolt and a weld nut. The left secondary bracket 20A may be attached to the canister 60 by a snap fit mechanism 50 similar to that shown in FIG. 5. In other embodiments, it may be attached by any other suitable fixing means, such as an adhesive or a hook-and-loop fastener.

Figure 8:
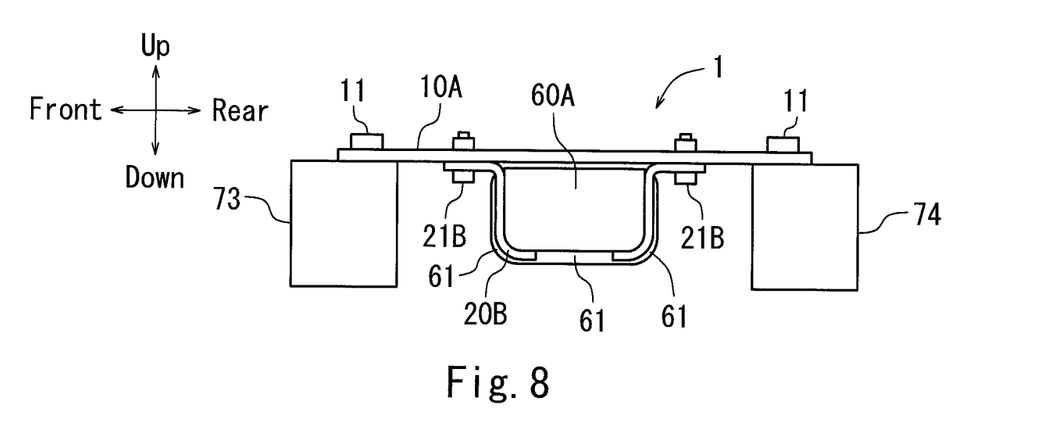
FIG. 8 is a front view of a canister mounting structure according to yet another embodiment.

Referring now to FIG. 8, which depicts yet another embodiment, a canister 60A may be supported by a left secondary bracket 20B from below. The left secondary bracket 20B is in a fitting engagement state with the circumferential surface of the canister 60A.

Specifically, the body of the canister 60A includes an engaging groove 61 extending from the bottom of the canister 60A and extending to both lateral sides of the canister 60A. The left secondary bracket 20B may be split into a pair of front and rear strips, each including a lower, horizontal portion and a lateral, vertical portion. The left secondary bracket 20B is configured to wrap the bottom of the canister 60A. The engaging groove 61 is configured such that the strips of the left secondary bracket 20B are fitted therein. For example, the engaging groove 61 may be a continuous groove that extends vertically along the lateral sides of the canister 60A. The engaging groove 61 may also extend horizontally in the front-rear direction in the bottom of the canister 60A. The front and rear ends of the left secondary bracket 20B are fastened to the lower side of the left primary bracket 10A by the left secondary fastener 21B. The canister 60A is attached to the left secondary bracket 20B by engagement of the lateral and lower portions of the left secondary bracket 20B with the engaging groove 61 in the canister 60A. In another embodiment, the left secondary bracket 20B may be a single unitary part rather than being split at the middle.

The canisters 60, 60A may be installed while the vehicle is in the assembly line and may be removed/reattached for maintenance in a similar way as the embodiments described above referring to FIGS. 4-6.

Figure 9:
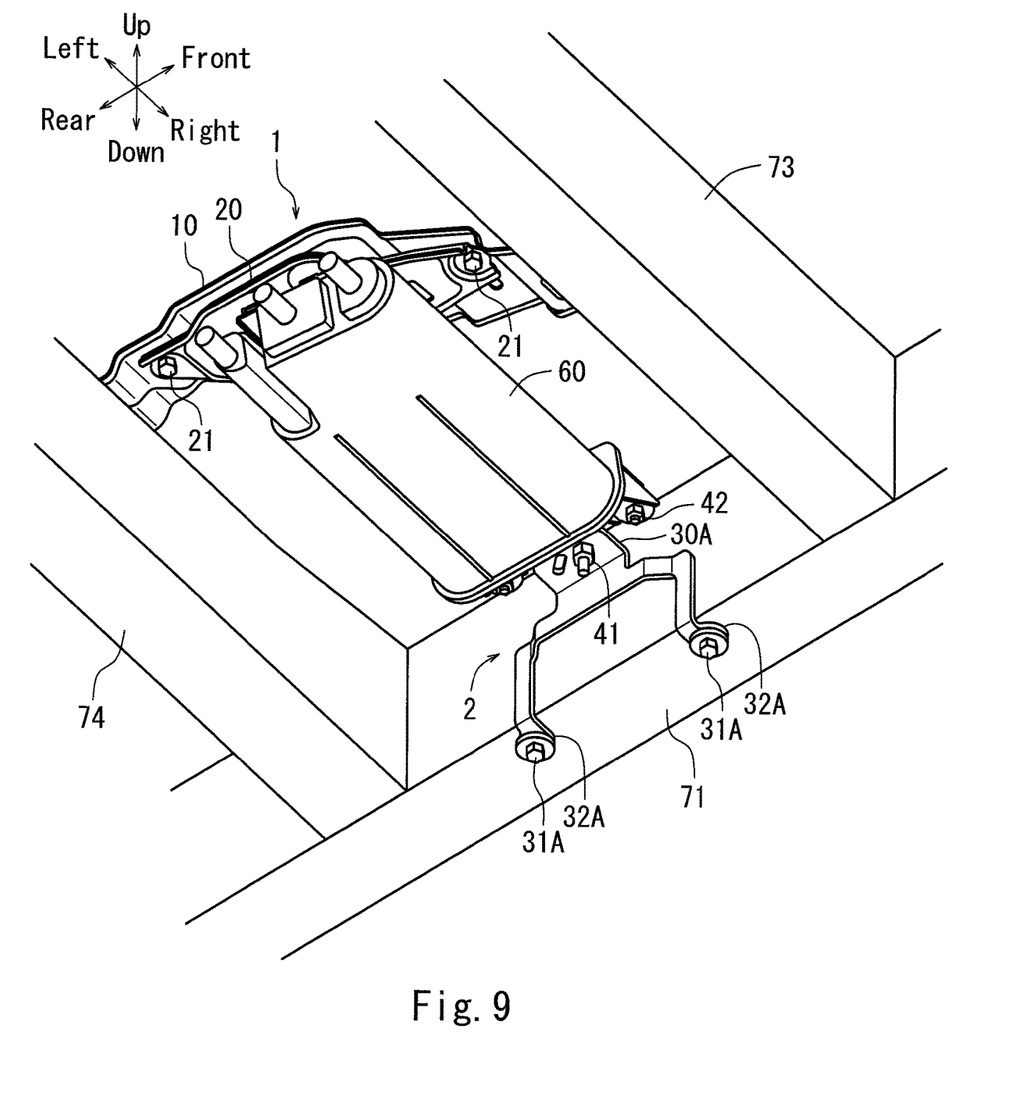
FIG. 9 is an enlarged perspective view a canister mounting structure according to another embodiment, as seen from below.

Referring now to FIG. 9, which depicts another embodiment, a right primary bracket 30A may be fastened to the lower surface, rather than the lateral surface, of the side member 71.

Specifically, the right primary bracket 30A includes fastening portions 32A at the opposite ends thereof. The opposite ends of the right primary bracket 30A extended to the lower surface of the side member 71. The fastening portions 32A are fastened to the lower surface of the side member 71 by a pair of front and rear right primary fasteners 31A. Each right primary fastener 31A may comprise a pair of threaded fasteners, such as a bolt and a weld nut.

When the canister 60 is installed while the vehicle is in the assembly line, the brackets 10, 20, 40 may have been attached to the canister 60 in a similar way as in Step 1 described above referring to FIGS. 4-6. In Step 2, the right primary bracket 30A is positioned to the left side surface of the side member 71. The right primary bracket 30A is fastened to the lower surface of the side member 71 at the fastening portions 32A. The left primary bracket 10 is then fastened to the cross members 73, 74, and the right secondary bracket 40 is fastened to the right primary bracket 30A.

The canister 60 may be installed while the vehicle is in the assembly line and may be removed/reattached for maintenance in a similar way as the embodiments described above referring to FIGS. 4-6.

A particular type of snap fit mechanism 50 has been described above. However, in another embodiment, the snap fit mechanism 50 can be replaced by any conventional snap fit mechanism or other attachment means that has a similar function.

In another embodiment, the canister 60 may be fastened to the left secondary bracket 20 by a fastener similar to the third fastener 42. Furthermore, the canister 60 may be fixed to the right secondary bracket 40 by a snap fit mechanism similar to the snap fit mechanism 50 described above.

Although specific embodiments have been described above, the present disclosure is not limited to those embodiments. Accordingly, various modifications, replacements, and/or omissions of features are possible without departing the spirit of the technology.

What is claimed is:

1. A canister mounting structure for a vehicle that includes a frame and an upper structure mounted on the frame, the canister mounting structure comprising:
   a primary bracket directly fastened to the frame by a primary fastener; and
   a secondary bracket fastened to the primary bracket by a secondary fastener, wherein the secondary bracket is configured to be attached to a canister;
   wherein:
      one of the primary fastener and the secondary fastener is configured to be fastened from above the frame; and
      the other of the primary fastener and the secondary fastener is configured to be fastened from below the frame;
   wherein:
      the frame comprises two parallel frame members;
      the primary bracket is fastened to an upper surface of each of the parallel frame member from above by the primary fastener;
      the primary bracket bridges a gap between the parallel frame members;
      the secondary bracket is configured to be fastened to the primary bracket from below by the secondary fastener; and
      the secondary bracket is attached to a downward facing surface of the primary bracket.

2. The canister mounting structure of claim 1, further comprising:
   a first attachment device comprising the primary bracket and the secondary bracket, the first attachment device being configured to fasten one end of the canister to the frame; and
   a second attachment device comprising a second primary bracket and a second secondary bracket, the second attachment device being configured to fasten another end of the canister to the frame.

3. A canister mounting structure for a vehicle that includes a frame and an upper structure mounted on the frame, the canister mounting structure comprising:
- a primary bracket directly fastened to the frame by a primary fastener; and
- a secondary bracket fastened to the primary bracket by a secondary fastener, wherein the secondary bracket is configured to be attached to a canister;

wherein:
- one of the primary fastener and the secondary fastener is configured to be fastened from above the frame; and
- the other of the primary fastener and the secondary fastener is configured to be fastened from below the frame;

wherein:
- the primary bracket is fastened to a lateral surface of a frame member of the frame by the primary fastener;
- the secondary bracket is configured to be fastened to the primary bracket from above by the secondary fastener;
- the secondary bracket is attached to an upward facing surface of the primary bracket; and
- a lower side of the primary fastener is unobstructed so as to be configured to allow fastening of the primary fastener to be performed from below the frame.

4. A canister mounting structure for a vehicle that includes a frame and an upper structure mounted on the frame, the canister mounting structure comprising:
- a primary bracket directly fastened to the frame by a primary fastener; and
- a secondary bracket fastened to the primary bracket by a secondary fastener, wherein the secondary bracket is configured to be attached to a canister;

wherein:
- one of the primary fastener and the secondary fastener is configured to be fastened from above the frame; and
- the other of the primary fastener and the secondary fastener is configured to be fastened from below the frame;

wherein the canister is attached to the secondary bracket by a snap fit mechanism comprising:
- a first engaging portion on the secondary bracket;
- a second engaging portion on the canister, wherein the second engaging portion is configured to allow sliding engagement with the first engaging portion and is configured to constrain movement of the secondary bracket and the canister relative to each other;
- a first locking portion on the secondary bracket; and
- a second locking portion on the canister, wherein the second locking portion is configured to hook on the first locking portion at a position during the sliding engagement of the first and second engaging portions and is configured to prevent disengagement of the secondary bracket from the canister.

* * * * *